UNITED STATES PATENT OFFICE.

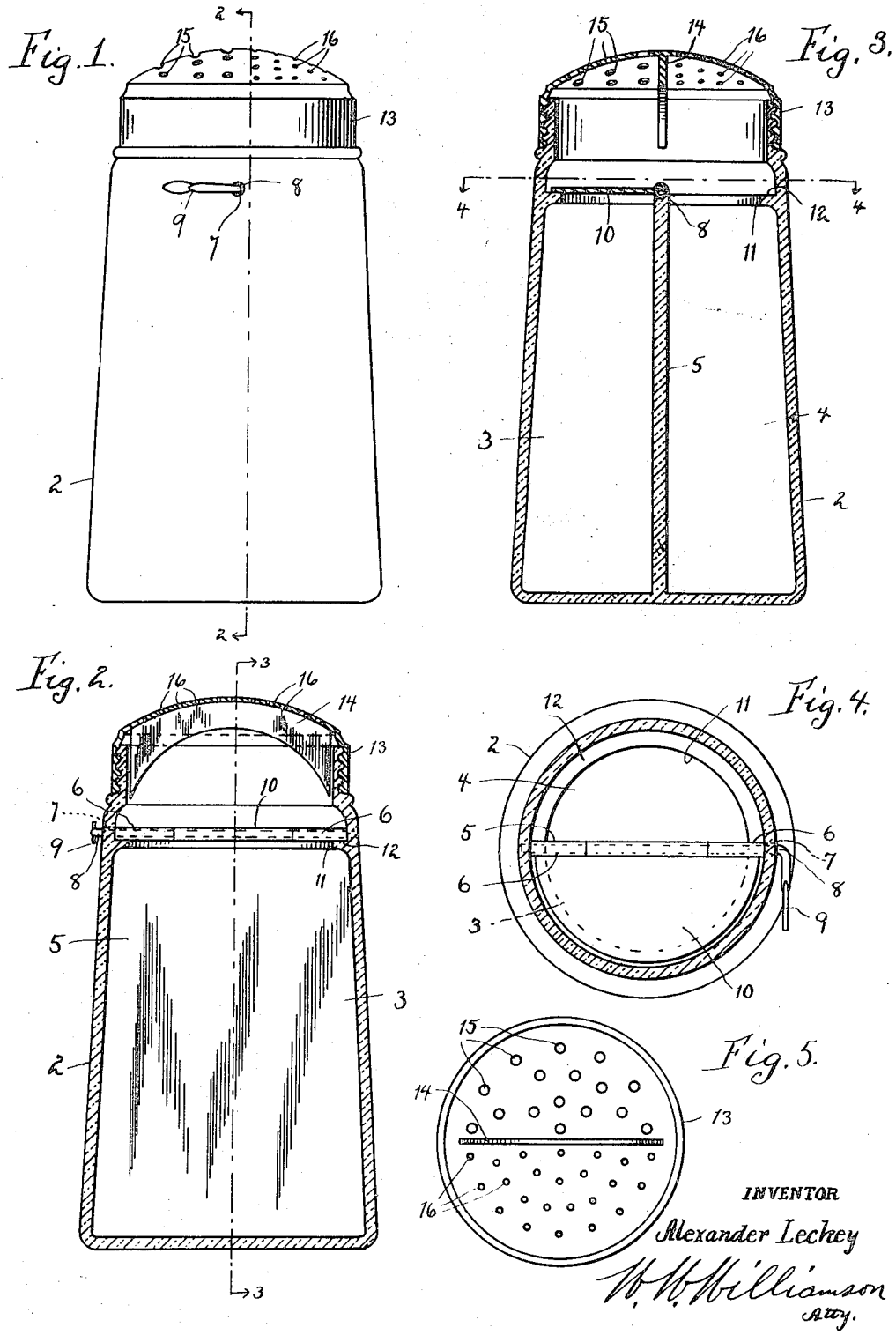
A. LECKEY.
COMBINED PEPPER AND SALT DISTRIBUTER.
APPLICATION FILED OCT. 13, 1916.
1,235,985.
Patented Aug. 7, 1917.
INVENTOR
Alexander Leckey

ALEXANDER LECKEY, OF CAMDEN, NEW JERSEY.

COMBINED PEPPER AND SALT DISTRIBUTER.

1,235,985.  Specification of Letters Patent.  Patented Aug. 7, 1917.

Application filed October 13, 1916. Serial No. 125,466.

*To all whom it may concern:*

Be it known that I, ALEXANDER LECKEY, a citizen of the United States, residing at Camden, in the county of Camden and State of New Jersey, have invented new and useful Improvements in Combined Pepper and Salt Distributers, of which the following is a specification.

My invention relates to new and useful improvements in combined pepper and salt distributers, and has for its object to provide an exceedingly simple and effective device of this character which is adapted to contain two condiments at one and the same time, either of which may be readily and quickly shaken from the holder independent of the other and without the two intermingling or becoming mixed.

A further object of the invention is to provide a pepper and salt distributer or shaker, a container or holder divided into two compartments by means of a vertical, longitudinal or upright partition, the holder having an internal flange situated at the top of each chamber against which rests the hinged valve wing or closure, when either of the chambers is closed at the top for preventing the accidental removal of the condiment, said hinged closure being hinged to the top of the partition and operated by a lever or handle carried by the hinged pin and situated outside of the holder.

Another object of the invention is to provide a perforated top for the holder having two sets of perforations of different size and provided on the interior with a depending deflector or baffle plate for preventing one condiment passing through the partitions above the chamber of the other condiment.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawing forming a part of this application, in which—

Figure 1, is a side elevation of my improved pepper and salt distributer.

Fig. 2, is a section at the line 2—2 of Fig. 1.

Fig. 3, is a section at the line 3—3 of Fig. 2.

Fig. 4, is a section at the line 4—4 of Fig. 3; and

Fig. 5, is an inner plan view of the cover or top.

In carrying out my invention as here embodied 2 represents a container or holder of any desirable shape, size and configuration open at the top and having its interior divided into two compartments 3 and 4 by means of a longitudinal or vertical partition 5 formed integral with the walls of the container. The upper edge of the partition terminates short of the top of the container and carries along its upper edge suitable bearing lugs 6 which may also be formed integral with the walls of the container and said partition. These bearing lugs have openings therethrough which aline with a hole 7 in the side wall of the container and in these bearings is rotatably mounted the valve pintle or pin 8, the outer end projecting beyond the outer surface of the side walls of the container and arranged at right angles to the main portion or body of the pin to form a handle or operating lever 9.

Between the bearing lugs on the pintle or pin 8 is mounted the closure valve or wing 10 which is adapted to rotate with said pin, and said closure is preferably arranged in alinement with the operating lever or handle 9, so that the position of said closure will be indicated by the position of said handle. The closure 10 is of sufficient size to close the upper or outlet end of the compartments 3 and 4, and the closing movements of said closure 10 are limited by an internal integral flange 11 situated approximately on a line with the upper end of the partition 5, thereby forming a seat 12 for the closure 10 to rest upon.

On the open end of the container is mounted a top or cover 13 in any suitable manner as by threads, and this cover is divided into two parts or chambers by a transverse depending deflector or baffle plate 14 which alines with the partition 5 when the top or cover 13 is in position, and the lower edge of this deflector or baffle plate is preferably shaped to conform with the edge of the closure 10 or arcuate as here shown when the interior of the container is round. The space between the hinged point of the closure 10 and the lower edge of the deflector 14 is greater than the width of the closure, so as to permit said closure to readily pass the deflector.

On one side of the deflector 14, the top wall of the cover 13 is provided with perforations 15 of one size, and on the other side of said deflector with holes or perforations 16 of a different size, as for instance those designated by the numeral 15 are long enough to permit the passage of salt, while those designated by the numeral 16 are of sufficient size to permit the passage of pepper.

In practice the compartment 3 is filled with salt and the compartment 4 with pepper or other similar condiments, and when one of them is to be used, as for instance the salt, the closure 10 is swung over until it lies across the outlet of the compartment 4 and rests upon the seat 12 formed by the flange, the container is inverted and shaken in the ordinary manner to remove the contents of the chamber 3 through the perforations 15, and said contents will be prevented from entering that portion of the cover 13 provided with the perforations 16 by the deflector 14. When the container is returned to its upright position, the salt will return to the compartment 3 and any portion thereof which may have fallen to the other side will rest upon the closure 10, and when said closure is moved over to the position shown in Fig. 3, so that pepper may be removed from the compartment 4, the salt resting on top of the closure 10 will be thrown or returned to the compartment 3.

When the closure is in the position shown in Fig. 3, the container may be inverted and shaken as hereinbefore described for removing any of the contents of the compartment 4 through the perforations 16.

From the foregoing it will be obvious that when any of the contents of one compartment is being removed, the closure 10 must be held upon its seat across the outlet of the other compartment by means of the handle or lever 9 which may be readily done by the forefinger of the user.

Of course I do not wish to be limited to the exact details of construction as here shown, as these may be varied within the limits of the appended claim without departing from the spirit of my invention.

Having thus fully described my invention, what I claim as new and useful, is—

In a device of the character stated, a container open at the upper end, an integral partition for dividing the interior into two compartments, said partition terminating short of the upper end of the container, an integral internal flange formed with the container, approximately on line with the upper end of the partition, bearing lugs carried by the partition, a pintle or pin passing through the side walls of the container and journaled in said bearing lugs, the outer end of said pin being provided with an operating lever or handle, a closure or valve carried by said pin and adapted to rotate therewith for closing either of the compartments, said closure when in a closed position engaging a portion of the flange, a cover or top detachably secured to the container, and a depending deflector carried by the top of said cover and adapted to aline with the partition when the cover is in position, said cover having perforations therein of one size on one side of the deflector, and of a different size on the other side of the deflector.

In testimony whereof, I have hereunto affixed my signature.

ALEXANDER LECKEY.